United States Patent
Prabath et al.

(10) Patent No.: US 10,671,507 B2
(45) Date of Patent: Jun. 2, 2020

(54) APPLICATION PERFORMANCE ANALYTICS PLATFORM

(71) Applicant: Capital One Services, LLC, McLean, VA (US)

(72) Inventors: Anu Prabath, Plano, TX (US); Ashish Singam, Mount Prospect, IL (US); Manisha Bodala, Frisco, TX (US); Laszlo Szerenyi, Chesterfield, VA (US); Eric Thornton, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 32 days.

(21) Appl. No.: 16/171,033

(22) Filed: Oct. 25, 2018

(65) Prior Publication Data

US 2020/0133814 A1    Apr. 30, 2020

(51) Int. Cl.
| | |
|---|---|
| *G06F 17/00* | (2019.01) |
| *G06F 11/34* | (2006.01) |
| *G06F 11/30* | (2006.01) |
| *G06F 11/32* | (2006.01) |
| *G06N 20/00* | (2019.01) |
| *G06F 16/22* | (2019.01) |
| *G06F 16/23* | (2019.01) |

(52) U.S. Cl.
CPC ........ *G06F 11/3409* (2013.01); *G06F 11/302* (2013.01); *G06F 11/327* (2013.01); *G06F 16/2228* (2019.01); *G06F 16/2379* (2019.01); *G06N 20/00* (2019.01)

(58) Field of Classification Search
CPC .. G06F 11/3409; G06F 11/327; G06F 11/302; G06F 16/2379; G06F 16/2228; G06N 20/00
See application file for complete search history.

(56) References Cited

U.S. PATENT DOCUMENTS

| | | | |
|---|---|---|---|
| 8,874,642 B2 | 10/2014 | Bhagat et al. | |
| 9,798,647 B2 | 10/2017 | Lindo et al. | |
| 2012/0166636 A1 | 6/2012 | Page et al. | |
| 2012/0311138 A1 | 12/2012 | Inamdar et al. | |
| 2014/0149466 A1* | 5/2014 | Sato | G06F 16/21 707/803 |
| 2014/0180738 A1* | 6/2014 | Phillipps | G06Q 10/0631 705/7.12 |
| 2015/0358391 A1 | 12/2015 | Moon et al. | |
| 2018/0219743 A1 | 8/2018 | Garcia et al. | |
| 2018/0373617 A1* | 12/2018 | Gaier | G06F 11/3612 |

* cited by examiner

*Primary Examiner* — Greta L Robinson (57) ABSTRACT

Various embodiments are generally directed to techniques of collecting analyzing information on various types of applications in an environment by an application performance analytics platform and acting on the analyzed information. The application performance analytics platform may include at least a monitoring system, a time series database, and an APM tool collector, all of which may be programmatically interfaced with or connected to each other. The APM tool collector may access or pull APM metrics from one or more APM tools and input the metrics to the monitoring system. The time series database may access or pull log files and extract log data for analysis. Based on the analysis, the application performance analytics platform may generate one or more alerts.

20 Claims, 8 Drawing Sheets

APPLICATION PERFORMANCE ANALYTICS PLATFORM

BACKGROUND

Application performance management (APM) relates to the monitoring and management of performance and availability of various software applications and related components in a given environment. APM tools may be used to detect and diagnose application performance issues in the environment and maintain an expected level of service.

Typically, a single APM tool (or a single type of APM tool) is implemented in an information technology (IT) environment. Thus, it may be very difficult to instrument a single APM tool to effectively monitor and manage all application performance and the various components of those applications deployed in the IT environment. It is particularly difficult when the applications are distributed in virtual, cloud-based systems, which may increase the variability and unpredictability of the measurements. Moreover, the use of a single APM tool imposes a great dependency on its out-of-the-box features without much room for customizability or flexibility. Even if additional APM tools are implemented in the same environment to distribute the management-related tasks, it may be difficult to integrate and aggregate the numerous tools and corresponding data.

Accordingly, there is a need for a high-performing platform that aggregate many different types of APM tools and efficiently monitor and manage all applications and related components in an environment.

SUMMARY

Various embodiments are generally directed to a high-performing application performance analytics platform that collects and analyzes information on various types of applications in a given environment.

The application performance analytics platform may include at least a monitoring system, a time series database, and an APM tool collector exporter, all of which may be programmatically interfaced with or connected to each other. The APM tool collector may access or pull numerous APM metrics from one or more APM tools and input the metrics to the monitoring system. Moreover, the time series database may access or pull log files and extract log data for analysis, which may include applying different types of analytics and machine learning to predict trends and anomalies in the environment. Based on the analysis performed on the APM metrics and/or the extracted log data, the application performance analytics platform may generate one or more alerts.

DETAILED DESCRIPTION

Various embodiments are generally directed to a high-performing application performance analytics platform that is at least APM-tool independent, performs trend analysis and/or predict anomalies, compares application infrastructures, sets up automated performance test scenarios, and generates a variety of alerts to appropriate users.

In embodiments, the application performance analytics platform includes a monitoring system and a time series database, which may be programmatically interfaced with or programmatically connected to the monitoring system. For example, the monitoring system may collect various metrics from configured targets at predetermined intervals, evaluate rule expressions, and/or display results. The monitoring system may also generate or trigger different types of alerts if one or more conditions are observed to be true, such as a metric exceeding a predetermined threshold value. The alerts may be e-mail alerts, SMS alerts, voice alerts, cloud-based incident alerts, etc. Moreover, the time series database, for instance, may be optimized for fast, high-availability storage and retrieval of time series data for operations monitoring, application metrics, and/or real-time analytics.

According to examples, the platform may also include an APM tool collector for pulling or accessing, by the platform, numerous APM metrics from one or more APM tools. The APM tool collector may be programmatically interfaced with or connected to the monitoring system, where the monitoring system may perform analysis on the pulled or collected APM metrics. Moreover, the application performance analytics platform may pull or access log files and input the log files to the time series database for extracting log data and performing analysis on the same. In examples, analytics and/or machine learning may be applied to the data stored in the time series database to predict various trends and anomalies, the results of which may be provided to an open-source visualization tool or other suitable types of visualization tools.

In further embodiments, the platform may also include a node exporter that measures machine-related resources (e.g., memory, CPU utilization, etc.) or other suitable information from at least one cloud-based server and inputs those measurements to the monitoring system. The platform may further include a cloud-based monitoring service exporter for pulling or accessing monitoring data from at least one cloud-based monitoring service.

In examples, a Virtual Private Cloud network (VPC), such as a Development VPC, may implement the application performance analytics platform. Various "production" and "non-production" related VPCs in an enterprise environment may connect to the application performance analytics platform. A production VPC may include VPCs associated with one or more business units of an enterprise. All the VPCs in the enterprise environment, for instance, may be provisioned in the cloud.

In additional examples, the application performance analytics platform may have a user interface, e.g., a graphical user interface (GUI), that displays data aggregated from one or more of the above-described components (the monitoring system, the time series database, the APM tool collector, the node exporter, the cloud-based monitoring service exporter, etc.) in a simple and comprehensible manner to allow users to intuitively interact with the platform and the components thereof. For instance, a user may be able to view results, information, and/or data associated with performance analytics, predictive analysis, infrastructure analysis, application workload, host analysis, and/or platform onboarding.

Previously or currently available APM tools create tool dependency for users and provide rigid out-of-the-box features that may be limited in both functionality and usability for enterprise environments. The above-described application performance analytics platform and the related embodiments and examples described herein are advantageous over the previously or currently available APM tools. For example, the application performance analytics platform is APM tool independent and allows data to be accessed or pulled from numerous different APM tools and showcase the data in the same, tool-independent interface viewer. Additionally, the application performance analytics platform performs trend analyses and anomaly predictions, compares various application infrastructures, and sets up numerous automated performance test scenarios. Accordingly, the platform described herein removes any data and resource skillset dependency on a single APM tool and bridges the gap created by the usage of different APM tools across the enterprise environment. Moreover, a combination of trends and alerts may help better plan for future application performance issues and outages. Further, the application performance analytics platform allows the consolidation of various application infrastructures and their respective specifications from different sources and the comparison among the same. And the platform may develop performance workload models that are used in the automatic creation and set up of various performance test scenarios.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

Figure 1:
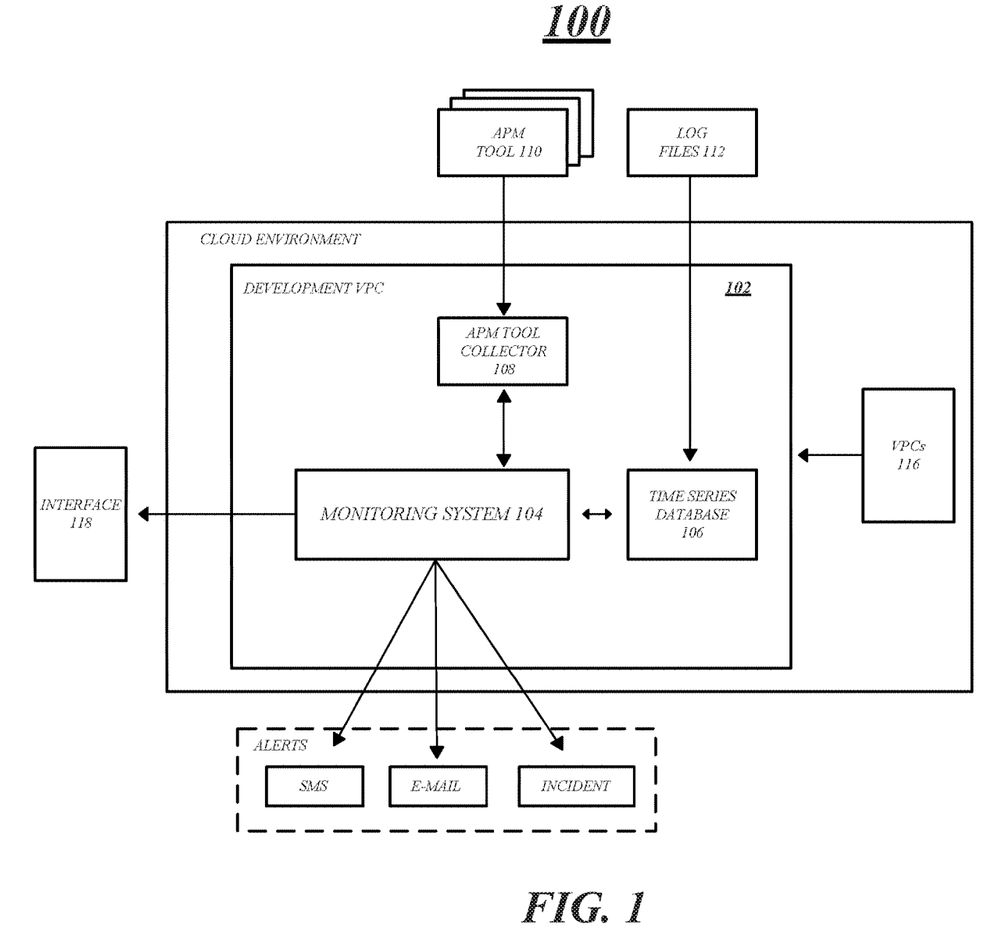
FIG. 1 illustrates an example system having an application performance analytics platform in accordance with one or more embodiments.

FIG. 1 illustrates an example system 100 having an application performance analytics platform 102 according to one or more embodiments. As will be further discussed below, one or more computing devices, or processing circuitry thereof, may be operable to execute instructions that provide and support the application performance analytics platform 102 and the various components therein.

As shown, the platform 102 includes a monitoring system 104 and a time series database 106. By way of example, the monitoring system 104 may be a cloud-native monitoring system, such as Prometheus (which is an open-source monitoring and alerting toolkit), and may be configured to collect various metrics from configured targets at predetermined intervals, evaluate rule expressions, display results, and the like. The monitoring system 104 may also generate or trigger different types of alerts, as will be further described below. The time series database 106 may be an open-source database platform, such as InfluxDB, and may be optimized for fast, high-availability storage and retrieval of time series data for operations monitoring, application metrics, and/or real-time analytics.

The monitoring system 104 and the time series database 106 may be programmatically interfaced with or connected to each other, as shown by the double-headed arrow. It may be understood that the terms programmatically interface, interfaced, or interfacing with, or, programmatically connect, connected, or connecting to, used herein, are to be interpreted broadly and may be understood to mean two or more components connecting or interacting with each other at a programming level and/or a hardware level.

Moreover, the platform 100 includes an APM tool collector 108, which pulls data, information, metrics, etc. from at least one APM tool 110 (the additional APM tools indicated by the cascaded blocks behind APM tool 110). For example, the APM tool 110 may be AppDynamics—a performance monitoring platform for applications in cloud computing environments and data centers, New Relic—an open-source software analytics product for application performance monitoring that delivers real-time and trending data about web applications and non-web application performance, or any other suitable APM tool. In at least that regard, the APM tool collector 108 may be implemented at an abstraction layer and may be considered an aggregator of APM-tool-related data from all relevant APM tools irrespective of tool type or compatibility among each other. As illustrated, the APM tool collector 108 is programmatically interfaced with or connected to the monitoring system 104. Thus, the aggregated data from the APM tool collector 108 may be input to the monitoring system 104 to be analyzed, the results of which may be displayed on an interface 118 and/or output as one or more alerts, e.g., an SMS alert, an e-mail alert, a cloud-based incident alert (such as a PagerDuty alert). It may be understood that the APM tool collector may be programmed in python and/or Java programming language or any other suitable language.

The time series database 106 may access or pull log files 112, which may be Splunk logs (where Splunk is a software platform for consolidating and indexing any log and machine data, including structured, unstructured, and complex multi-line application logs), ELK logs (where ELK stands for ElasticSearch, Logstash and Kibana, an open-source stack for log analytics), etc. Log data may be extracted from the accessed or pulled log files and may be analyzed by the time series database 106. Additionally, or alternatively, the log files may be input to the monitoring system 104 for analysis, the results of which may then be used to generate the above-described alerts and/or may be displayed on the interface 118. Moreover, the time series database may automatically capture data on a concurrent set of users, a plurality of business transactions, a plurality of transaction usage patterns, a transaction response time, etc., where a performance test scenario may be generated based on the automatically captured data.

As illustrated in FIG. 1, the application performance analytics platform 102 may be supported by, or run on, any network that is implemented in a cloud or non-cloud environment, such as a private LAN or Amazon Web Services (AWS) cloud. One or more VPCs 116 (e.g., production VPCs, non-production VPCs) in the environment may connect to the application performance analytics platform 102. The platform 102 may be tool independent and does not rely on a single APM tool. In fact, it is configured to aggregate and incorporate many different types of tools to better monitor and manage the applications deployed in the environment. Moreover, the platform 102 is flexible in that the monitoring system 104 may be configured to handle short-term data and the time series database 106 may be configured to handle long-term data.

Figure 2:
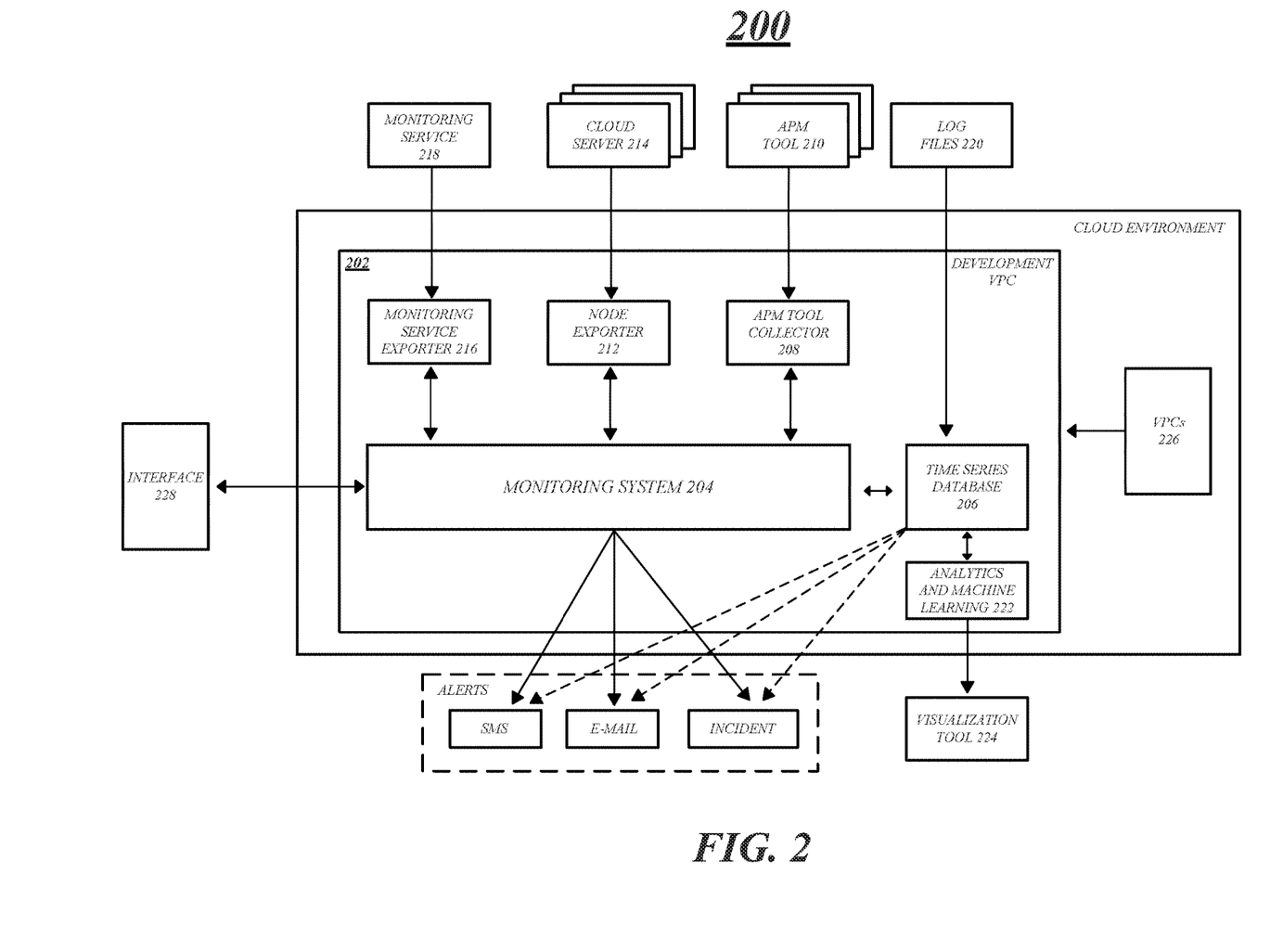
FIG. 2 illustrates another example system having of an application performance analytics platform in accordance with one or more embodiments.

FIG. 2 illustrates another example of a system 200 having an application performance analytics platform 202 according to one or more embodiments. Again, one or more computing devices, or processing circuitry thereof, may be operable to execute instructions that provide and support the application performance analytics platform 202 and the various components therein.

As illustrated, the application performance analytics platform 202 includes a monitoring system 204 and a time series database 206, which is programmatically interfaced with or programmatically connected to the monitoring system 204. An APM tool collector 208 access or pulls APM-tool-related data from at least one APM tool 210. Moreover, the time series database 206 may be configured to access or pull various log files 220 for storage and analysis. For example, the monitoring system 204, the time series database 206, the APM tool collector 208, the at least one APM tool 210, and log files 220 may be similar or similarly configured to the monitoring system 104, the time series database 106, the APM tool collector 108, the at least one APM tool 110, and the log files 112 of FIG. 1. Further, the application performance analytics platform 202 is supported by or implemented as a Development VPC with one or more VPCs 226 connected thereto.

Also illustrated in FIG. 2 is a node exporter 212 and a monitoring service exporter 216 included in the platform 202, both of which are programmatically interfaced with or programmatically connected to the monitoring system 204, as indicated by the double-headed arrows. By way of example, the node exporter 212 may access, pull, or measure various types of information from at least one cloud server 114 (where additional cloud servers are depicted by the cascaded blocks behind the cloud server 114). The information accessed, pulled, or measured by the node exporter may be data related to performance management and monitoring of business units in the enterprise that does not have or implement their own APM tools, or may be machine-related resources, such as memory and central processing unit (CPU) utilizations. It may be understood that the node exporter 212 may be programmed in GO programming language.

Similarly, the monitoring service exporter 216 accesses or pulls monitoring data from a monitoring service 218, which may be a monitoring service provided by the cloud service provider, such as CloudWatch by AWS. The monitoring service exporter 216 may be programmed in Java programming language.

It may be understood that the information pulled or accessed by the node exporter 212 and the monitoring service exporter 216 may be input to the monitoring system 204 for analysis. To at least that end, the monitoring service 218 may collect and track metrics, collect and monitor log files, set alarms, and automatically react to changes in the cloud resources.

In at least this regard, the application performance analytics platform 202—via at least the monitoring system 204, the time series database 206, the APM tool collector 208, the node exporter 212, and the monitoring service exporter 216—is able to collect any and all information or data related to application performance in, and/or the overall performance of, the computing environment into a single, central platform for analysis.

In one example, analytics and machine learning 222 may be applied to data extracted or acquired by the time series database 206 from the log files 220 or any other suitable source of information. The applied analytics and machine learning 222 may be used for predictive analysis, e.g., prediction of trends, prediction of anomalies, within the computing environment. A ridge-regression algorithm, for instance, may be used to build a prediction-metrics model, where a regression model is solved (e.g., the loss function is the linear least squares function, and regularization is given by the I2-norm, also known as the Ridge Regression or Tikhonov regularization, and this estimator has built-in support for multi-variate regression).

In embodiments, the prediction-metrics model may be applied on existing data to predict future data. The prediction-metrics model may be applied to derive coefficients for various metrics, and based on the derived coefficients, further derive at least a predicted value and an upper limit and a lower limit for the predicted value. For example, various data trends and/or anomalies may be predicted— e.g., predictions may be determined every minute for the next 14 days based on the data of the immediately preceding year. For a specific minute, the prediction may be based on the previous hour preceding that minute, the previous day preceding that minute, the previous three weeks preceding that minute, the previous three months preceding that minute, and/or the previous year preceding that minute. For special seasons or occasions during the year, such as thanksgiving week, the specific data associated with those times and/or around those times during the previous year to predict trends for the current year.

It may be understood that the analytics and machine learning 222 may be a separate computing process or performed separately from the time series database 206, for instance, the analytics and machine learning 222 may be programmatically interfaced with or connected to the time series database 206 (as shown by the double-headed arrow between the analytics and machine learning 222 and the time series database 206). Alternatively, it may be part of or performed by the time series database 206 itself.

The time series database 206 may output the results of the predictions to the monitoring system 204 for further analysis or generating various types of alerts to users, or as shown, the time series database 206 itself may output the alerts to the users, as shown by the dashed arrows. For example, when a predicted value exceeds a predetermined threshold value (e.g., predicted 10,000 customers to use an application the day before Thanksgiving exceeds a customer limit of 7,000) an alert is generated to warn the user of application overload. Moreover, the results of the predictions, the applied analytics, and/or the machine learning may be output to a visualization tool 224, such as Grafana—an open-source dashboard and graph composer for data visualization and monitoring, which may be used by a user. In examples, the results may include a predicted trend, a future application workload forecast, a historical transaction data, and an incident related to performance and/or capacity, etc.

The application performance analytics platform 202 acquires performance-related data and evaluate performance engineering and enhance line-of-business (LOB) decision making by providing robust environment metrics using analytical and predictive techniques. For example, the platform 202 may perform: different types of analyses (e.g., performance analysis, comparative analysis, trend analysis); predict trends or anomalies; compare infrastructures of applications; and/or set up automated performance test scenarios. Various aspects of the one or more above-described features of the platform 202, the results thereof, and even the acquired performance-related data from the environment may be displayed on a user interface for further interaction by a user. For example, the user interface may display the results of the analysis performed on the APM metrics acquired by the APM tool collector 208 and/or one or more of the alerts that may be generated by the monitoring system 204.

By way of example, performance analysis may involve the APM collector 208 collecting or accessing APM metrics from all major vendor or open-source APM tools and showcasing the APM metrics in a performance view format via a user interface. Comparative analysis performed by the platform 202 may be the capability to compare key process indicators (KPIs) from one or more APM tools in the environment or across a plurality of environments. To at least this end, the platform 202 is APM tool independent and is advantageous because it removes data dependency and resource skillset dependency on a single APM tool. Further, a centralized platform bridges the gap created by different APM tool usage across the enterprise environment.

Moreover, the platform 202 allows for trend analysis and anomaly predictions. For example, historical, transactional data trends may be used to apply machine learning to enable insights into future application workload and/or performance or capacity related incidents. As set forth above, trends or anomalies tend to change based on the time of the year, month, day, etc. The platform 202 also allows the ability to set up complex timespan, multi-metrics rule-based alerts on predicted data, trends, and/or anomalies. This is advantageous in that a combination of trends and alerts may help users better plan for further application performance issues and minimize outages.

In another example, the platform 202 is configured to compare application infrastructures, such as compare production and test environments based on one or more of the following infrastructure specifications: tiers, the number of servers in each tier, server hardware specifications, connectivity between tiers and nodes, application process level resources, etc. This is advantageous at least because developers encounter application performance issues in production since performance testing is done on lower environments, which does not match production environment capacity. Moreover, it is tedious and time-consuming to consolidate infrastructure specifications from different sources.

In a further example, the platform 202 may automatically capture concurrent users, business transactions, transaction usage patterns, transaction response times, and utilize these metrics to create performance test scenarios automatically. The automatic creation of performance test scenarios is advantageous because performance test results are not accurate if it is not designed to simulate application production usage like the test scenario. It is also difficult for developers to design performance test scenarios with accurate application usage data, and further, it needs specialized performance engineering skillset to develop performance workload model used in designing the test scenario, all of which is obviated by the platform 202 and the ability to automatically set up performance test scenarios.

Figure 3:
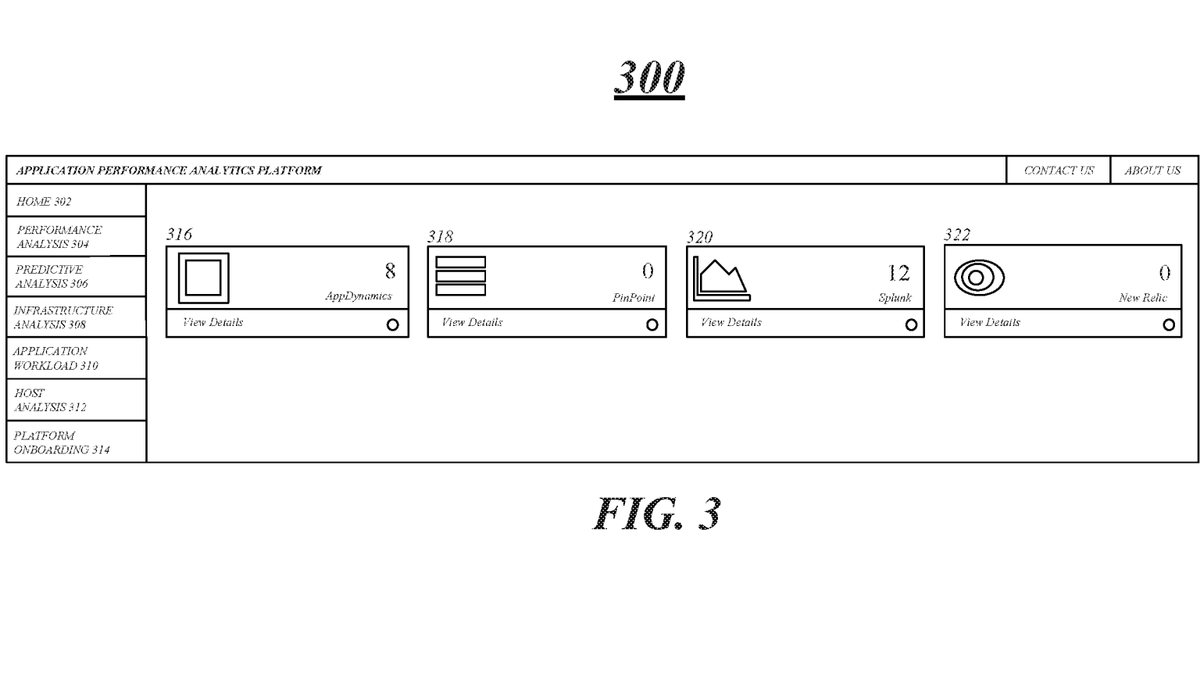
FIG. 3 illustrates an example user interface in accordance with one or more embodiments.

FIG. 3 illustrates an example user interface 300 of an application performance analytics platform in accordance with one or more embodiments. A user, for instance, may interact with the application performance analytics platform via the interface 300, which may be a graphical user interface (GUI) that may be displayed by one or more computing devices.

As shown, the user interface 300 includes various icons on the left-hand side: a home icon 302, a performance analysis icon 304, a predictive analysis icon 306, an infrastructure analysis icon 308, an application workload icon 310, a host analysis icon 312, and a platform onboarding icon 314.

Moreover, the user interface 300 displays various feature-based icons horizontally across the interface, such as an APM tool icon 316 for the AppDynamics APM tool that indicates, for instance, eight pending action items, an APM tool icon 318 for the PinPoint APM tool that indicates zero action items, a log management tool icon 320 for the Splunk log management tool that indicates 12 action items, and an APM tool icon 322 for the New Relic APM tool that indicates zero action items.

A user may select the "view details" icon at the bottom of each icon 316, 318, 320, and 322 to view the details related to the action items indicated or any other suitable information related to the associated tool. Moreover, the user may select any of the icons 302, 304, 306, 308, 310, 312, and 314. For example, when the user selects the infrastructure analysis icon 308, the results of a comparative analysis between two or more application infrastructures may be displayed to the user. In another example, when the user selects the application workload icon 310, data associated with a workload model related to, for instance, an automated performance test scenario setup may be displayed. Similarly, the host analysis icon 312, when selected, displays to the user information on a network host or a host application. And the user may select the platform onboarding icon 314, which displays information related to an action or process of integrating a new application or the like. Examples of selecting the performance analysis icon 304 and the predictive analysis icon 306 will be further described below with respect to FIG. 4 and FIG. 5, respectively.

Figure 4:
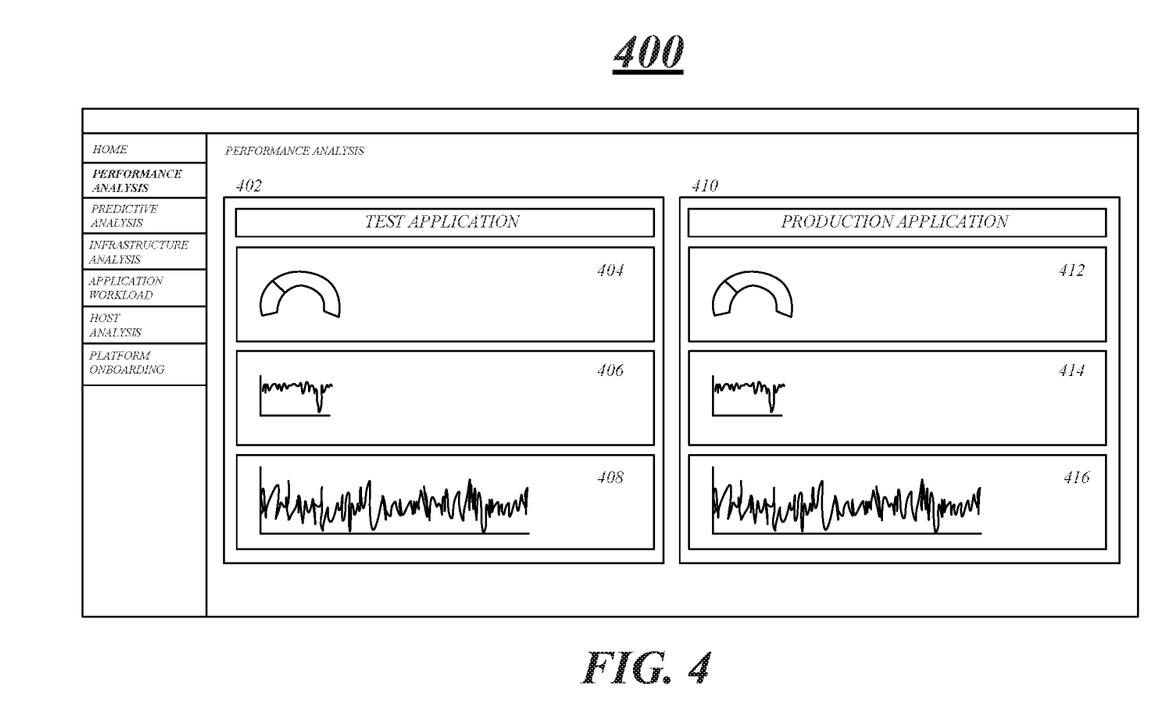
FIG. 4 illustrates another example of a user interface in accordance with one or more embodiments.

FIG. 4 illustrates an example user interface 400 displaying performance analysis results in accordance with one or more embodiments. As shown, the interface 400 shows the performance analysis results for a test application 402 and a production application 410. For example, the test application result 402 includes at least three separate boxes showing various analysis metrics. Box 404 shows a transactions-per-second (TPS) measurement, as a gauge graph, for the test application. The box 404 may also include other measurements, such as an errors-per-second (EPS) measurement. Similarly, box 406 shows another TPS measurement in graph form and may also include an EPS measurement. Box 408 shows, for instance, a graph that indicates an individual transaction response time of the test application.

The production application result 410 also includes three separate boxes: a box 412 having a gauge graph of a TPS measurement and gauge graphs of other measurements, such as an EPS measurement; a box 414 having a graph of a second TPS measurement and a second EPS measurement; and a box 416 including a graph that shows an individual transaction response time of the production application.

Figure 5:
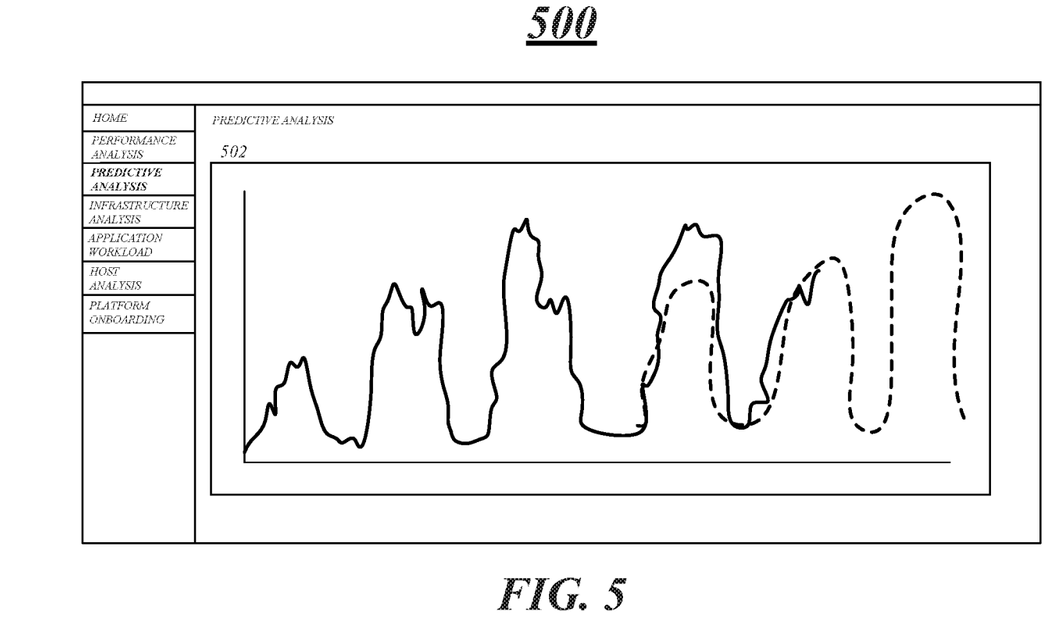
FIG. 5 illustrates a further example of a user interface in accordance with one or more embodiments.

FIG. 5 illustrates an example user interface 500 displaying predictive analysis results in accordance with one or more embodiments. As illustrated, the interface 500 contains a graph 502 indicating user load on an application on various dates within a predefined time interval, e.g., a day, a week, a month, etc.

For example, the solid line in the graph 502 represents the actual data associated with the user load. And the dashed line represents a model-forecast or prediction of the user load in the future. The model-forecast or prediction may be based on the application of the above-described prediction-metrics model for the application. The prediction shows that user load will reach its peak two cycles after the last actual-cycle. Moreover, the graph 502 may also include a model forecast upper limit and a model forecast lower limit, and further include anything related to a predicted trend, a future application workload forecast, a historical transaction data, and an incident related to performance and/or capacity, etc. It may also be understood that more than one graph may be displayed in the user interface 500, each showing a predictive analysis for different applications or the same application for different business units, etc.

Figure 6:
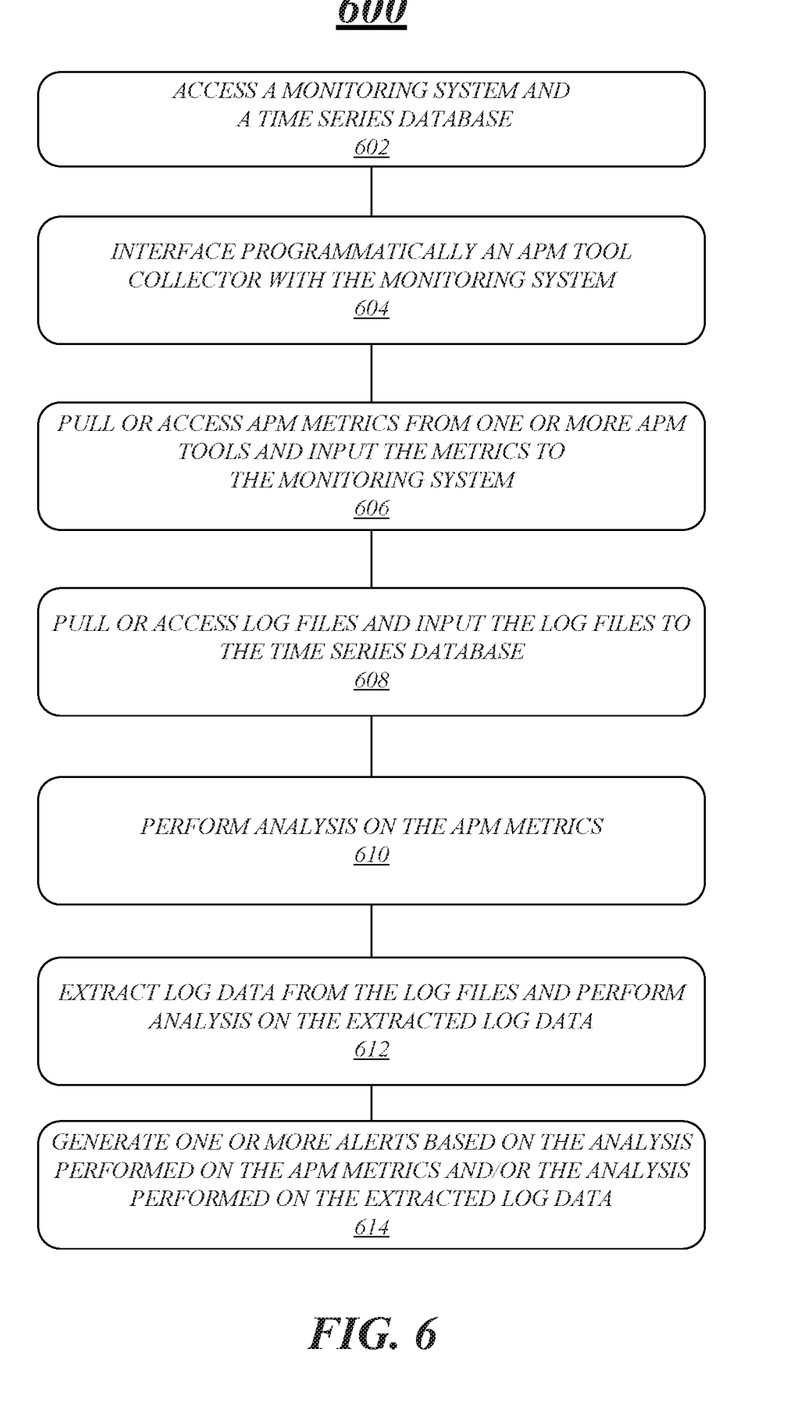
FIG. 6 illustrates an example flow diagram in accordance with one or more embodiments.

FIG. 6 illustrates a flow diagram 600 in accordance with one or more embodiments. It may be understood that the features associated with the illustrated blocks may be performed or executed by one or more computing devices and/or processing circuitry contained therein.

At block 602, a monitoring system and a time series database is accessed. As set forth above, the monitoring system may be a cloud-native system that collects various metrics from configured targets at predetermined intervals, evaluate rule expressions, display results, and the like and the time series database may be an open-source database platform that may be optimized for fast, high-availability storage and retrieval of time series data for operations monitoring, application metrics, and/or real-time analytics. The monitoring system and the time series database may be programmatically interfaced with or programmatically connected to each other.

At block 604, an APM tool collector is programmatically interfaced with the monitoring system. The APM tool collector may be configured to pull data, information, metrics, etc. from one or more APM tools. The APM tool collector may be implemented at an abstraction layer and may acquire data from various types of APM tools irrespective of tool type, compatibility among each other, etc.

At block 606, numerous APM metrics may be pulled or accessed from the one or more APM tools and input to the monitoring system for analysis. The APM metrics may include any data or information associated with application performance.

At block 608, log files are pulled or accessed and input to the time series database. As described above, the log files may be Splunk logs, ELK logs, etc. At block 610, the analysis is performed on the APM metrics that were input to the monitoring system at block 606. The analysis may include performance analysis, comparative analysis, trend analysis, trend or anomaly predictions, application infrastructure comparisons, and automated performance test scenario setups, etc. Moreover, the results of the interview may be output to a user interface or the like.

At block 612, log data is extracted from the log files pulled or accessed at block 608 and analysis is performed on the extracted log data. The analysis may also include performance analysis, comparative analysis, trend analysis, trend or anomaly predictions, application infrastructure comparisons, and automated performance test scenario setups, etc. Analytics and machine learning may be applied to the data stored in the time series database to determine or calculate predicted values (and the upper and lower limits of the predicted values). The results of the analytics and machine learning process may be output to a visualization tool, such as Grafana.

At block 614, one or more alerts based on the analysis performed on the APM metrics and/or the analysis performed on the extracted log data is generated. The one or more alerts, which may be e-mail alerts, SMS alerts, incident alerts, etc. may be sent to user computing devices, such as smartphones, laptops, tablet computers, and so on. As set forth above, the alerts may be generated when current or projected values exceed predetermined values, for example, if a predicted value at a time in the future exceeds a predefined number. Other triggering events may include an instance when an application is underperforming based on load expectations, etc.

It may be understood that the blocks illustrated in FIG. 6 are not limited to any specific order. One or more of the blocks may be performed or executed simultaneously or near simultaneously. For example, the hashing and salting of the key may be performed at the same time.

Figure 7:
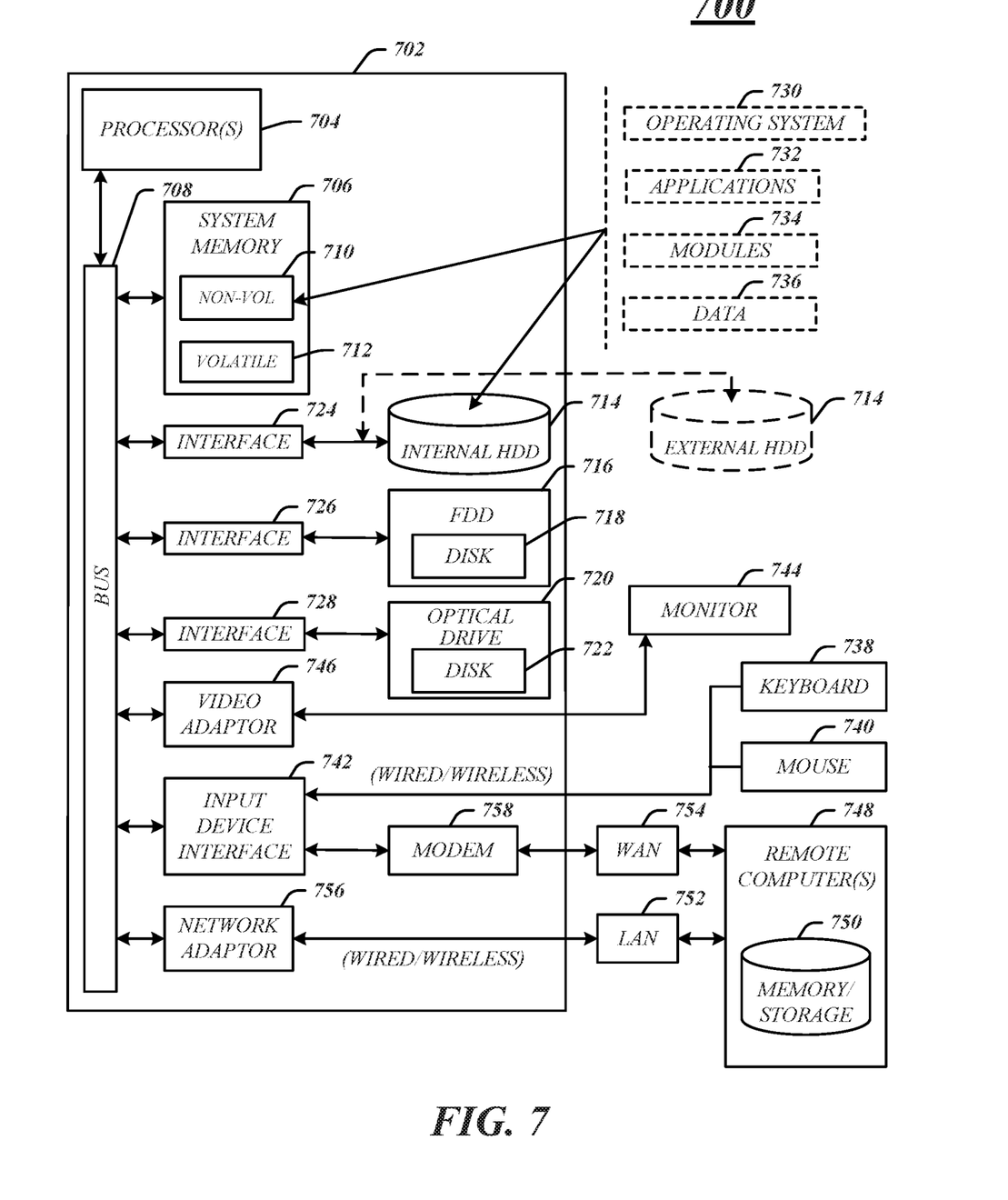
FIG. 7 illustrates an example computing architecture of a computing device in accordance with one or more embodiments.

FIG. 7 illustrates an embodiment of an exemplary computing architecture 700, e.g., of a computing device, such as a desktop computer, laptop, tablet computer, mobile computer, smartphone, etc., suitable for implementing various embodiments as previously described. In one embodiment, the computing architecture 700 may include or be implemented as part of a system, which will be further described below. As described above, at least one computing device and/or the processing circuitries thereof may be configured to at least execute, support, provide, and/or access the various features and functionalities of an application performance analytics platform (e.g., the monitoring system, the time series database, APM tool collector, etc.).

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes processor 704, a system memory 706 and a system bus 708. The processor 704 can be any of various commercially available processors, processing circuitry, central processing unit (CPU), a dedicated processor, a field-programmable gate array (FPGA), etc.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 800.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 704 through an input device interface 742 that is coupled to the system bus 708 but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754 or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 8:
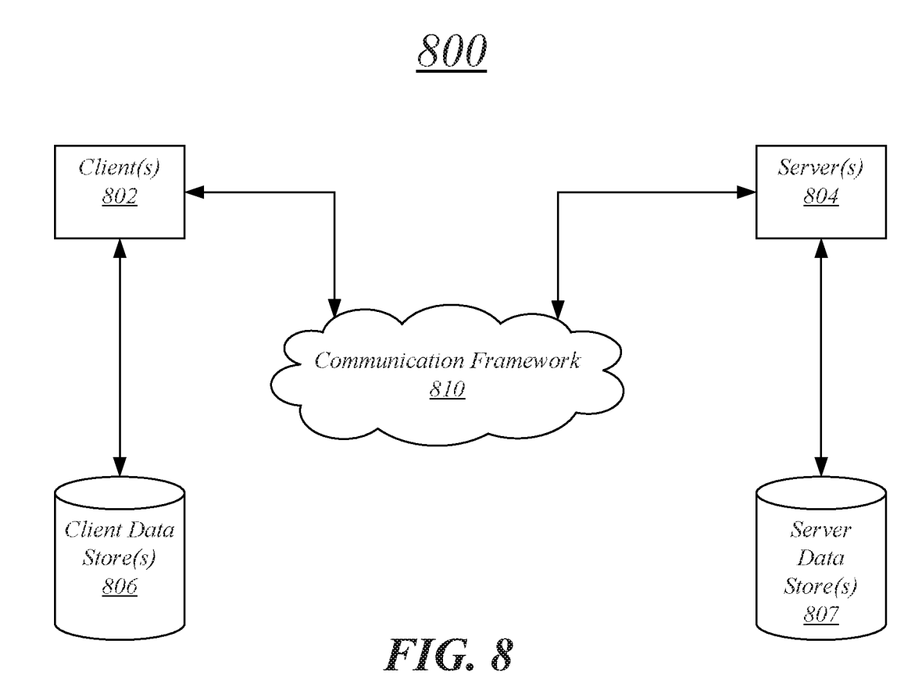
FIG. 8 illustrates an example communications architecture in accordance with one or more embodiments.

FIG. 8 is a block diagram depicting an exemplary communications architecture 800 suitable for implementing various embodiments. For example, one or more computing devices may communicate with each other via a communications framework, such as a network. At least one computing devices connected to the network may be a user computing device, such as a desktop computer, laptop, tablet computer, smartphone, etc. At least a second computing device connected to the network may be one or more server computers, which may be implemented as a back-end server. In some embodiments, the client computing device may be configured to access and interface with the application performance analytics platform. And the at least one back-end server computer, for instance, may support and provide all the functionalities of the application performance analytics platform.

The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The one or more clients 802 and the servers 804 are operatively connected to one or more respective client data stores 806 and server data stores 807 that can be employed to store information local to the respective clients 802 and servers 804, such as cookies and/or associated contextual information. By way of example, server data store 807 may store all hashed and salted biometric keys.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A system for an application performance analytics platform, the system comprising:
   at least one networking device; and
   one or more computing devices connected to the at least one networking device, wherein the one or more computing devices comprises:
   a memory to store instructions; and
   processing circuitry, coupled with the memory, operable to execute the instructions, that when executed, cause the processing circuitry to:
   access a monitoring system and a time series database;
   interface, programmatically, the monitoring system with the series database;
   interface, programmatically, an application performance management (APM) tool collector with the monitoring system;
   pull or access, by the APM tool collector, a plurality of APM metrics from two or more APM tools to aggregate and input the plurality of APM metrics to the monitoring system;
   pull or access a plurality of log files and input the plurality of log files to the time series database;
   perform analysis, by the monitoring system, on at least the plurality of APM metrics;
   extract, by the time series database, log data from the plurality of log files;
   perform analysis on extracted log data; and
   generate one or more alerts based on the analysis performed on the plurality of APM metrics and/or the analysis performed on the extracted log data.

2. The system of claim 1, wherein the processing circuitry is further caused to access, load, or communicate with a node exporter, wherein the node exporter measures one or more machine related resources from at least one cloud-based server, the one or more machine related resources including at least memory and central processing unit (CPU) utilization.

3. The system of claim 2, wherein the processing circuitry is further caused to access, load, or communicate with a cloud-based monitoring service exporter, wherein the cloud-based monitoring service exporter pulls or accesses monitoring data from a cloud-based monitoring service.

4. The system of claim 3, wherein the node exporter and the cloud-based monitoring service exporter are programmatically interfaced with the monitoring system and the measured one or more machine related resources from the at least one cloud-based server and the monitoring data from the cloud-based monitoring service are input to the monitoring system for analysis.

5. The system of claim 3, wherein the APM tool collector is programmed in python and/or Java programming language, wherein the node exporter is programmed in GO programming language, and wherein the cloud-based monitoring service exporter is programmed in Java programming language.

6. The system of claim 1, wherein the analysis performed on the extracted log data comprises:
applying analytics and/or machine learning on the extracted log data; and
providing one or more results of the applied analytics and/or machine learning to an open-source visualization tool.

7. The system of claim 6, wherein the one or more results of the applied analytics and/or machine learning comprises one or more of the following: (i) a predicted trend, (ii) a future application workload forecast, (iii) historical transaction data, and (iv) an incident related to performance and/or capacity.

8. The system of claim 7, wherein the one or more alerts include an e-mail alert and/or an incident alert, and wherein the one or more alerts are based on any one of the one or more results of the applied analytics and/or machine learning on the extracted log data.

9. The system of claim 1, wherein one or more results of the analysis performed on the plurality of APM metrics, and/or the one or more alerts, are generated and displayed on a user interface.

10. The system of claim 1, wherein the analysis performed on the plurality of APM metrics by the monitoring system comprises comparing Key Process Indicators (KPIs) among the two or more APM tools across a plurality of environments.

11. The system of claim 1, wherein the analysis performed on at least the plurality of APM metrics by the monitoring system comprises comparing a first application infrastructure with a second application infrastructure based on one or more of the following: (i) one or more tiers, (ii) a number of servers in each of the one or more tiers, (iii) one or more hardware specifications, (iv) connectivity between the one or more tiers and one or more nodes, and (v) one or more application process level resources.

12. The system of claim 1, wherein the time series database automatically captures data on one or more of the following: (i) a concurrent set of users, (ii) a plurality of business transactions, (iii) a plurality of transaction usage patterns, and (iv) a transaction response time, and wherein the time series database generates a performance test scenario based on the automatically captured data.

13. The system of claim 1, wherein the application performance analytics platform is implemented in a Development Virtual Private Cloud (VPC) and connects to one or more production VPCs and/or one or more non-production VPCs, wherein the production VPCs are VPCs associated with one or more business units of an enterprise.

14. The system of claim 1, wherein the application performance analytics platform is cloud native.

15. An apparatus comprising:
a memory to store instructions; and
processing circuitry, coupled with the memory, operable to execute the instructions, that when executed, cause the processing circuitry to:
access a monitoring system;
access, load, or communicate with an application performance management (APM) tool collector, wherein the APM tool collector is programmatically interfaced with the monitoring system;
pull or access, by the APM tool collector, a plurality of APM metrics from two or more APM tools to aggregate and input the plurality of APM metrics to the monitoring system;
perform analysis, by the monitoring system, on at least the plurality of APM metrics;
receive, by the monitoring system, one or more results of analysis performed on log data, wherein the analysis on the log data is performed by a time series database; and
generate one or more alerts based on the performed analysis on the plurality of APM metrics and/or the one or more results of the analysis performed on the log data.

16. The apparatus of claim 15, wherein the processing circuitry is further caused to access, load, or communicate with:
(i) a node exporter, wherein the node exporter measures one or more machine related resources from at least one cloud-based server, the one or more machine related resources including at least memory and central processing unit (CPU) utilization, and
(ii) a cloud-based monitoring service exporter, wherein the cloud-based monitoring service exporter pulls monitoring data from a cloud-based monitoring service, and
wherein the measured one or more machine related resources from the at least one cloud-based server and the monitoring data from the cloud-based monitoring service are input to the monitoring system for analysis.

17. The apparatus of claim 15, wherein the apparatus is a cloud-based server computer device.

18. A non-transitory computer-readable storage medium storing computer-readable program code executable by a processor to:
pull or access, via an application performance (APM) tool collector, a plurality of APM metrics from two or more APM tools;
aggregate and input the plurality of APM metrics to a monitoring system;
pull or access a plurality of log files;
input the plurality of log files to a time series database;
perform analysis, via the monitoring system, on at least the plurality of APM metrics;
extract, via the time series database, log data from the plurality of log files;
perform analysis on extracted log data; and
generate one or more alerts based on the performed analysis on the plurality of APM metrics and/or the performed analysis on the extracted log data.

19. The non-transitory computer-readable storage medium of claim 18, wherein the analysis performed on the extracted log data comprises:
applying analytics and/or machine learning on the extracted log data; and
providing one or more results of the applied analytics and/or machine learning to an open-source visualization tool.

20. The non-transitory computer-readable storage medium of claim 18, wherein the one or more results of the applied analytics and/or machine learning comprises one or more of the following: (i) a predicted trend, (ii) a future application workload forecast, (iii) historical transaction data, and (iv) an incident related to performance and/or capacity.

* * * * *